July 24, 1962

R. M. POWERS 3,046,090

PRODUCTION OF URANIUM MONOCARBIDE

Filed June 28, 1961

INVENTOR.
RICHARD M. POWERS
BY
Roland A. Anderson
Attorney

# United States Patent Office 3,046,090
Patented July 24, 1962

3,046,090
PRODUCTION OF URANIUM MONOCARBIDE
Richard M. Powers, Cold Spring Harbor, N.Y., assignor to the United States of America as represented by the United States Atomic Energy Commission
Filed June 28, 1961, Ser. No. 120,446
4 Claims. (Cl. 23—14.5)

The present invention relates generally to the subject of fuels for nuclear reactors and in particular to a new and improved method of making uranium monocarbide.

Uranium monocarbide has long been recognized as a potentially desirable fuel for nuclear reactors. Its thermal conductivity, in contrast to that of the oxide, $UO_2$, is close to that of uranium metal. It is a refractory compound which shows no significant creep until temperatures above 1000° C. are reached. Moreover, the carbon in the compound has a low neutron cross section and is easily handled in subsequent chemical processing. UC has the further advantages of an isotropic structure and excellent performance when irradiated to high burn-ups.

However, this fuel, in substantially stoichiometric proportions, has been more difficult to prepare than either uranium metal or uranium oxide. Preparation of UC from uranium tetrafluoride, $UF_4$, by conventional methods first requires formation of the metal. The metal is then ground to a powder, blended with carbon, compacted to form uranium-carbon pellets, and finally arc-melted to form UC. Another method requires hydriding of the uranium metal to form a hydride powder, $UH_3$. This is then dehydrided to form uranium powder. The powder is reacted with methane, $CH_4$, to form uranium carbide powder, which is then arc-melted or sintered.

It is the object of this invention to produce substantially stoichiometric uranium monocarbide by converting uranium tetrafluoride directly to uranium monocarbide without first reducing the tetrafluoride to the metal and without converting the metal to an oxide or hydride as in the conventional methods. Elimination of these steps substantially reduces the cost of UC.

Essentially, the method of this invention consists in reacting uranium tetrafluoride ($UF_4$) with silicon (Si) and carbon (C) to form uranium monocarbide (UC) and volatile silicon tetrafluoride ($SiF_4$) according to the following equation:

$$UF_4 + Si + C = UC + SiF_4\uparrow$$

The invention may be more fully understood by reference to the figures wherein.

Figure 1:
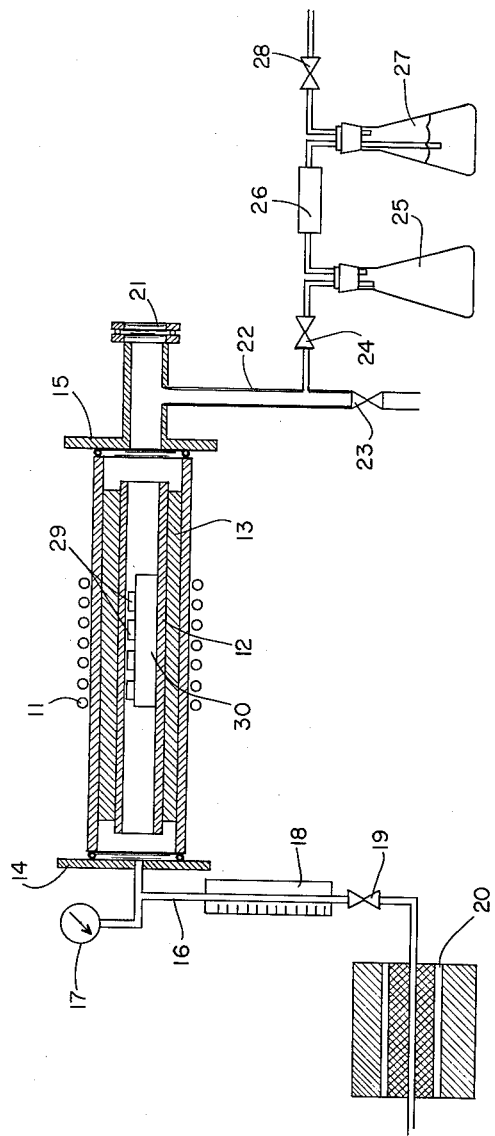
FIG. 1 is a schematic diagram of apparatus suitable for performing the method of this invention.

With reference to FIG. 1, the reactor consists of a tube 10 surrounded by an induction heating coil 11. Within the tube 10 is a graphite reaction tube 12 and surrounding insulation 13. Gasketed plates 14 and 15 close the ends of the tube 10. A protective atmosphere, such as argon, is admitted to the tube 10 through a line 16 which penetrates the end plate 14. Associated with this line 16 is a pressure gage 17, a flowmeter 18, a valve 19 and a gas drier 20. The latter contains calcium chips maintained at a temperature of about 500° C. to fully dry the argon before it enters the reaction tube.

The opposite end of the tube 10 is provided with a gasketed sight glass 21, and a gas outlet line 22. The latter has valves 23 and 24 for connecting the outlet respectively with a source of vacuum (not shown) and a water trap 25, a drier 26 and an absorber 27 for removing silicon tetrafluoride. Preferably, the absorbing medium is a barium chloride, $BaCl_2$, solution. A further valve 28 permits the line to be connected with a source of vacuum (not illustrated).

Pellets of $UF_4$, Si and C 29 are carried on a graphite boat 30 within the graphite tube.

In practicing the method of this invention, uranium tetrafluoride, silicon and carbon are thoroughly mixed and then pressed into rods or pellets at a pressure of 25 tons per square inch. The mol ratio of the starting $UF_4$ to Si to C. is adjusted to approximately 1 to 1.24 to 0.84 respectively. The charge is loaded on the graphite boat 30 and inserted in the furnace. The pellets are heated inductively to temperatures between 1500° C. to 1700° C., held for a predetermined period at temperature and then cooled to room temperature. During the heating, argon is flowed through the reactor to sweep the $SiF_4$ which is evolved in the reaction. As the reaction proceeds, silicon tetrafluoride is collected in the barium chloride solution.

After the charge has cooled, the product of the reaction, in the form of friable pellets is removed from the furnace in air. Due to the coarse particle size, the uranium monocarbide formed in the reaction is not pyrophoric. The product is then arc-melted to form a massive uranium monocarbide product.

The invention may be understood in greater detail from the following specific examples:

EXAMPLE I

Run 19

This run was made under an argon atmosphere and utilized a mixture of $UF_4$, Si and C. in the mol ratio 1 to 1.24 to 0.84 respectively. The starting materials were pelletized at 25 t.s.i. and inserted in the reactor. The temperature in the reactor was held at about 1625° C. and the pressure about 15″ Hg.

Upon completion of the reaction, the uranium carbide was removed from the furnace and proved to have the following composition expressed in weight percent:

| | |
|---|---|
| Total U | 91.34 |
| Total C | 5.55 |
| Total F | 0.18 |
| Total $O_2$ | 0.38 |
| Total Si | 0.07 |

Figure 2:
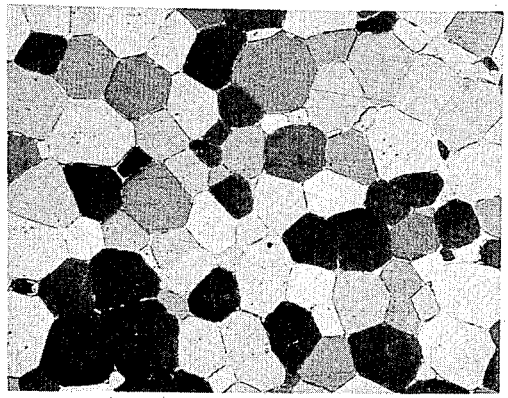
FIG. 2 is a photomicrograph of arc-melted uranium monocarbide magnified 500× made by this invention.

An arc-cast button was prepared from this run and sectioned for metallographic examination. The result, shown in the photomicrograph, FIG. 2, is essentially pure uranium monocarbide with a slight trace of free uranium at the grain boundaries.

Figure 3:
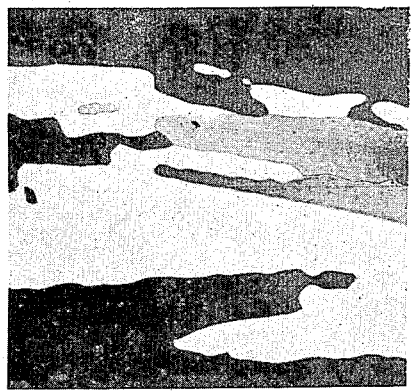
FIGS. 3 and 4 are photomicrographs magnified, respectively, 100× and 500× of uranium monocarbide made by this invention.
Figure 4:

FIGS. 3 and 4 are photomicrographs of arc-melted samples from another run under the same conditions as run 19, Example I. The arc-cast button shown in FIGS. 3 and 4 had a density of 13.78 gm./cc. as compared with 13.63 gm./cc. for stoichiometric UC. In FIGS. 3 and 4 this material is seen to be approximately stoichiometric UC containing a trace of free uranium which appear as light spots in the photomicrographs.

EXAMPLE 2

Run 25

In this experiment, the starting mol ratio of $UF_4$ to Si to C was 1.00 to 1.12 to 0.84 respectively. The temperature was 1591° C., the time at temperature was 1 hour and the pressure was 20″ Hg. Upon analysis the uranium carbide product was found to contain the following elements, expressed in weight percent:

| | |
|---|---|
| U | 91.66 |
| C | 4.93 |
| Si | 0.35 |
| F | 0.024 |
| $O_2$ | 0.64 |
| $N_2$ | 0.035 |

The primary phase was UC and had a hardness (Knoop 25 g.) of 488–703.

Figure 5:
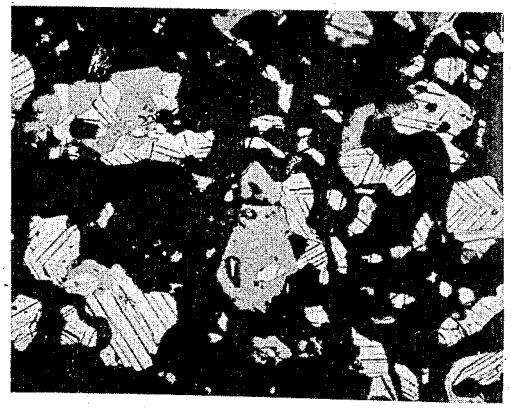
FIG. 5 is a photomicrograph of uranium monocarbide powder as produced by this method, said powder being blended with Bakelite and magnified 500×.
Figure 6:
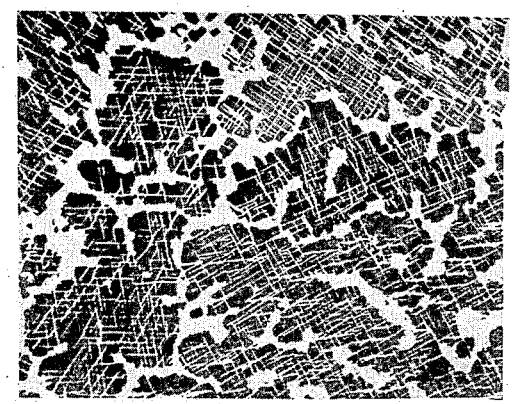
FIG. 6 is a photomicrograph of an arc-melted button made from the same run as the powder shown in FIG. 5 and magnified 500×.

Powder from run 25 (Example 2) was blended with Bakelite and pressed into a metallographic sample. The structure of the powder particles appears in the photomicrograph, FIG. 5 embedded in a dark matrix of Bakelite. The darker etching phase is UC and the lighter phase is apparently $UC-UC_2$. A photomicrograph of an arc-melted button from run 25 is shown in FIG. 6.

It has been found that pellets fail to react completely if the temperature in the furnace is too low. On the other hand, if the temperature is too high, uranium fluorides will volatilize with a resulting loss of product as compared with the theoretical yield of UC. A satisfactory temperature range for this method is 1500° C. to 1700° C. Similarly, the time at temperature must exceed 5 minutes at 1600° C. for the reaction to go to completion. The reaction is complete after 1 hour at this temperature as shown by experiment, and it is to be expected that a somewhat shorter time will also suffice.

Pressures between 15″ Hg and 25″ Hg have been successfully used in the furnace. Higher pressure, such as atmospheric pressure, may advantageously be used to suppress loss of uranium fluoride by volatilization. It will still be necessary, however, to maintain a low partial pressure of $SiF_4$ in the system by sweeping with argon. A lower reaction temperature would also be expected to reduce volatilization losses. Ball milling the reactants to a fine particle size may be expected to increase the reaction rate and permit use of lower furnace temperatures.

It will be seen that this invention provides a new and improved method of making substantially stoichiometric UC from $UF_4$ without the need for first reducing the $UF_4$ to uranium metal and then either hydriding or oxidizing the uranium metal prior to reacting it with carbon. In eliminating these intermediate steps, the present method represents a marked advance over the methods of the prior art in quality of product and economy.

I claim:
1. The method of making essentially stoichiometric uranium monocarbide that consists in mixing uranium tetrafluoride, silicon and carbon, pelletizing the mixture, reacting the pelletized mixture at a temperature of approximately 1500° C. to 1700° C. until the reaction goes to completion and forms unranium monocarbide powder, and arc melting the powder to produce a massive uranium monocarbide body.

2. The method of making essentially stoichiometric uranium monocarbide that consists in mixing uranium tetrafluoride, silicon and carbon, pelletizing the mixture, reacting the pelletized mixture at a temperature of approximately 1500° C. to 1700° C. to form uranium monocarbide powder and silicon tetrafluoride, continuously removing the silicon tetrafluoride as it evolves during the reaction, permitting the uranium monocarbide powder to cool, and arc-melting the powder to form a massive uranium monocarbide body.

3. The method of making essentially stoichiometric uranium monocarbide that consists in mixing uranium tetrafluoride, silicon and carbon, pelletizing the mixture, reacting the pelletized mixture at a temperature of approximately 1500° C. to 1700° C. in a flowing inert atmosphere to form uranium monocarbide powder and silicon tetrafluoride, continuously removing the silicon tetrafluoride as it evolves during the reaction, permitting the uranium monocarbide powder to cool, and arc-melting the powder to form a massive uranium monocarbide body.

4. The method of making essentially stoichiometric uranium monocarbide that consists in mixing uranium tetrafluoride, silicon and carbon, pelletizing the mixture, reacting the mixture at a temperature of approximately 1600° C. for approximately one hour to form uranium monocarbide powder and silicon tetrafluoride, maintaining a flowing inert atmosphere at a pressure of about 15″ Hg to 25″ Hg during the reaction, permitting the uranium monocarbide powder to cool, and arc-melting the powder to form a massive uranium monocarbide body.

References Cited in the file of this patent
AEC Document BMI 1441, page 60, 63 May 31, 1960.
AEC Document NYO 2691, page 14, Feb. 10, 1961.